(12) United States Patent
Shirotori (10) Patent No.: US 10,996,423 B2
(45) Date of Patent: May 4, 2021

(54) LENS ASSEMBLY

(71) Applicant: NIDEC SANKYO CORPORATION, Nagano (JP)

(72) Inventor: Toshio Shirotori, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 104 days.

(21) Appl. No.: 16/369,164

(22) Filed: Mar. 29, 2019

(65) Prior Publication Data

US 2019/0302392 A1    Oct. 3, 2019

(30) Foreign Application Priority Data

Mar. 30, 2018    (JP) .............................. JP2018-066630

(51) Int. Cl.

| | |
|---|---|
| *G02B 7/02* | (2021.01) |
| *G03B 21/14* | (2006.01) |
| *F21V 17/00* | (2006.01) |
| *G03B 17/00* | (2021.01) |
| *H04N 5/225* | (2006.01) |

(52) U.S. Cl.
CPC .............. *G02B 7/021* (2013.01); *G02B 7/025* (2013.01)

(58) Field of Classification Search
CPC .......... G02B 27/021; G02B 7/02; G02B 7/14; G02B 7/023; G02B 7/08; G02B 25/002; G02B 7/10; H04N 5/2251; H04N 5/2253; F21V 9/08; G03B 17/14
USPC ......... 359/811–830, 808, 513, 704; 353/100; 362/455; 396/529–530; 348/373–374
See application file for complete search history.

(56) References Cited

U.S. PATENT DOCUMENTS

2018/0364441 A1* 12/2018 Hubert ............... H04N 5/23287

FOREIGN PATENT DOCUMENTS

JP    2014170123 A    9/2014

* cited by examiner

*Primary Examiner* — Dawayne Pinkney
(74) *Attorney, Agent, or Firm* — Cantor Colburn LLP (57) ABSTRACT

A lens assembly may include a plurality of lenses; and a lens barrel holding the plurality of lenses. At least one of the lenses may include a glass lens press-fit and held in a lens holder comprising a cylindrical portion. An adhesive-agent groove connected to a fitting hole inlet may be disposed in a face of the lens holder adjacent to the fitting hole inlet to retain an adhesive agent injected into the adhesive-agent groove, the glass lens being fit to the lens holder via the fitting hole inlet. Catches protruding along a direction of an optical axis may be disposed inside the adhesive-agent groove. An adhesive agent may be disposed in a gap formed between a side face of the glass lens and the catches face facing each other, the adhesive agent fixing the glass lens to the lens holder.

8 Claims, 8 Drawing Sheets

LENS ASSEMBLY

CROSS REFERENCE TO RELATED APPLICATION

The present application claims priority under 35 U.S.C. § 119 to Japanese Application No. 2018-066630 filed Mar. 30, 2018, the entire content of which is incorporated herein by reference.

BACKGROUND

Field of the Invention

At least an embodiment of the present invention relates to a lens assembly, such as a lens assembly including a plurality of lenses and a lens barrel holding the lenses.

Description of the Related Documents

In a lens assembly including a plurality of lenses internally held in a lens barrel, a resin or metal lens holder may be used for assembly of a glass lens (for example, refer to Japanese Unexamined Patent Application Publication No. 2014-170123). In specific, the glass lens is fit in the lens holder and disposed inside the lens barrel.

Lenses disposed inside a lens barrel are positioned along the direction of the optical axis by fitting lenses over the lenses already fit in the lens barrel. For a lens holder holding a glass lens, the lens holder itself is positioned but the glass lens is merely held by the lens holder. Thus, an external impact on a lens assembly (a higher order apparatus holding lenses) may cause only the glass lens held by the lens holder to be displaced, thereby lowering the optical properties.

SUMMARY

At least an embodiment of the present invention, which has been conceived in light with the above-described circumstances, provides a technique for enhancing the fixing strength of a glass lens fixed to a lens holder included in a lens assembly, the lens assembly including a plurality of lenses including the glass lens fit to the lens holder and a lens barrel internally holding the lenses.

A lens assembly according to at least an embodiment of the present invention comprises a plurality of lenses; and a lens barrel holding the plurality of lenses, wherein, at least one of the lenses comprises a glass lens press-fit and held in a lens holder comprising a cylindrical portion, an adhesive-agent groove connected to an fitting hole inlet is disposed in a face of the lens holder adjacent to the fitting hole inlet to retain an adhesive agent injected into the adhesive-agent groove, the glass lens being fit to the lens holder via the fitting hole inlet, the adhesive-agent groove comprise catches protruding along a direction of an optical axis, and an adhesive agent is disposed in a gap formed between a side face of the glass lens and the catches face facing each other, the adhesive agent fixing the glass lens to the lens holder. The contact area to be adhered between the catches and the glass lens can be sufficiently provided, in particular, in the thickness direction of the glass lens, to establish a stable fixed state.

The tips of the catches may comprise deformed portions bent radially inward by welding.

A gap may be formed between the deformed portions and the glass lens, and an adhesive agent may be disposed in the gap.

The lens holder may comprise a plurality of projections disposed along a circumferential direction adjacent to the non-fitting hole inlet of the cylindrical portion, and a recess is disposed between two of the projections disposed adjacent to each other in a region on the non-fitting hole inlet facing the press-fit portion in the direction of the optical axis. In other words, the regions around the non-fitting hole inlet facing the press-fit portions in the direction of the optical axis are not provided with the projections. The recess prevents a decrease in the positional precision of the glass lens in the direction of the optical axis due to burr formed during press-fitting (shavings from the cylindrical portion formed during press-fitting).

The projections may comprise contact portions disposed in contact with the glass lens, and the contact portions may have convex curved faces. The contact portions come into point contact with the glass lens due to the spherical or non-spherical convex curved surfaces of the contact portions. This can improve the positional precision of the glass lens in the lens holder on the side of non-fitting hole inlet along the axial line. That is, to establish satisfactory surface contact between the contact face and the glass lens, the contact face should be formed with high precision, whereas in point contact, high precision can be readily established.

The deformed portions are swaged portions swaging the glass lens. The catches and the contact portions may have identical shapes in the direction of the optical axis. In specific, the contact portions are disposed in the lower portions (on the image side) of the catches and can support the glass lens from below during swaging.

The recess may comprise an adhesive-agent groove adjacent to the non-fitting hole inlet and filled with an adhesive agent. The non-fitting hole inlet side of the lens holder is also fixed by adhesive agent, thereby suppressing displacement of the glass lens in the direction of the optical axis.

According to at least an embodiment of the present invention, the fixing strength of a glass lens fixed to a lens holder included in a lens assembly can be enhanced, the lens assembly including a plurality of lenses including the glass lens fit to the lens holder and a lens barrel internally holding the lenses.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Modes for carrying out the invention (hereinafter referred to as "embodiments") will now be described with reference to the accompanying drawings.

First Embodiment

Figure 1:
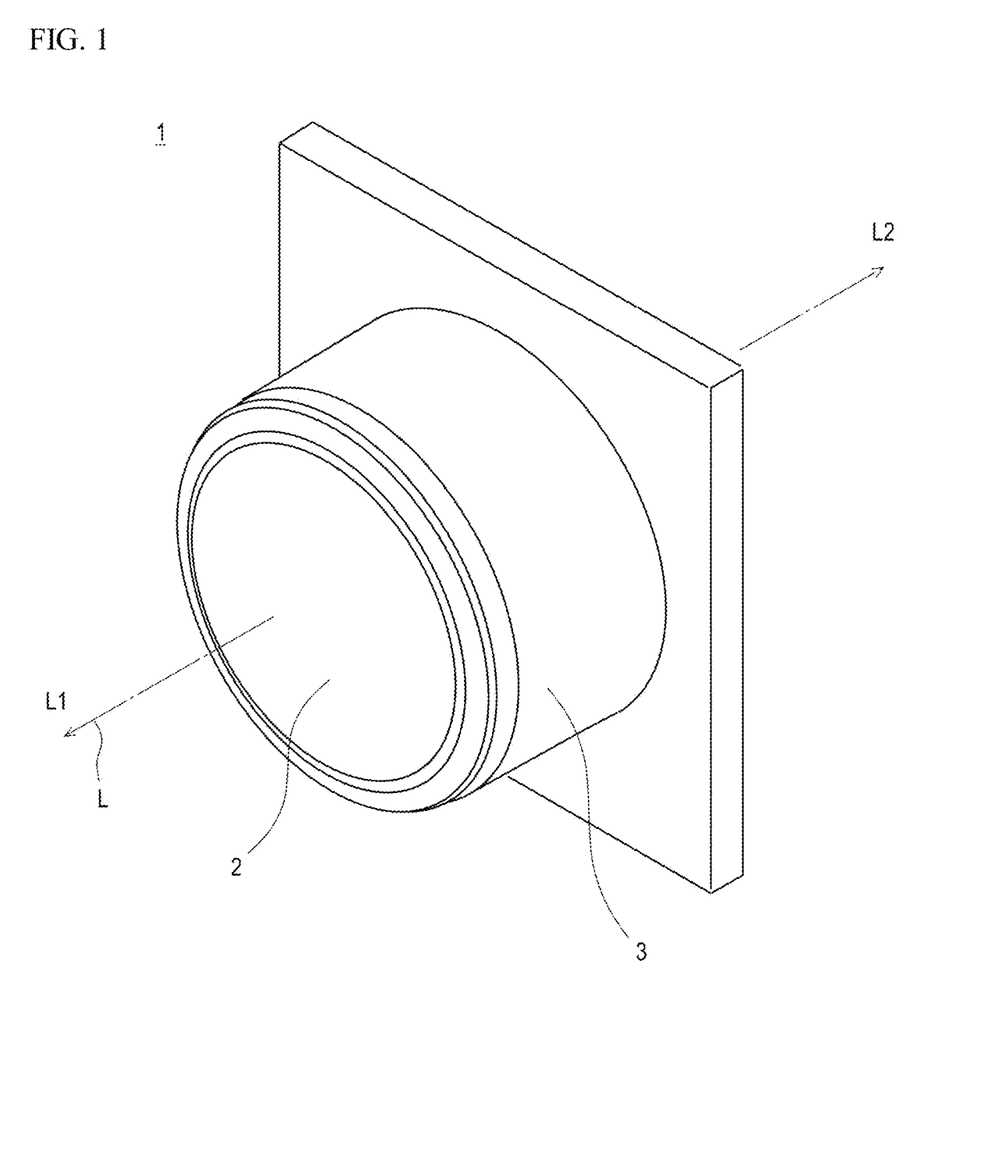
FIG. 1 is a perspective overall view of a lens assembly according to a first embodiment.
Figure 2:
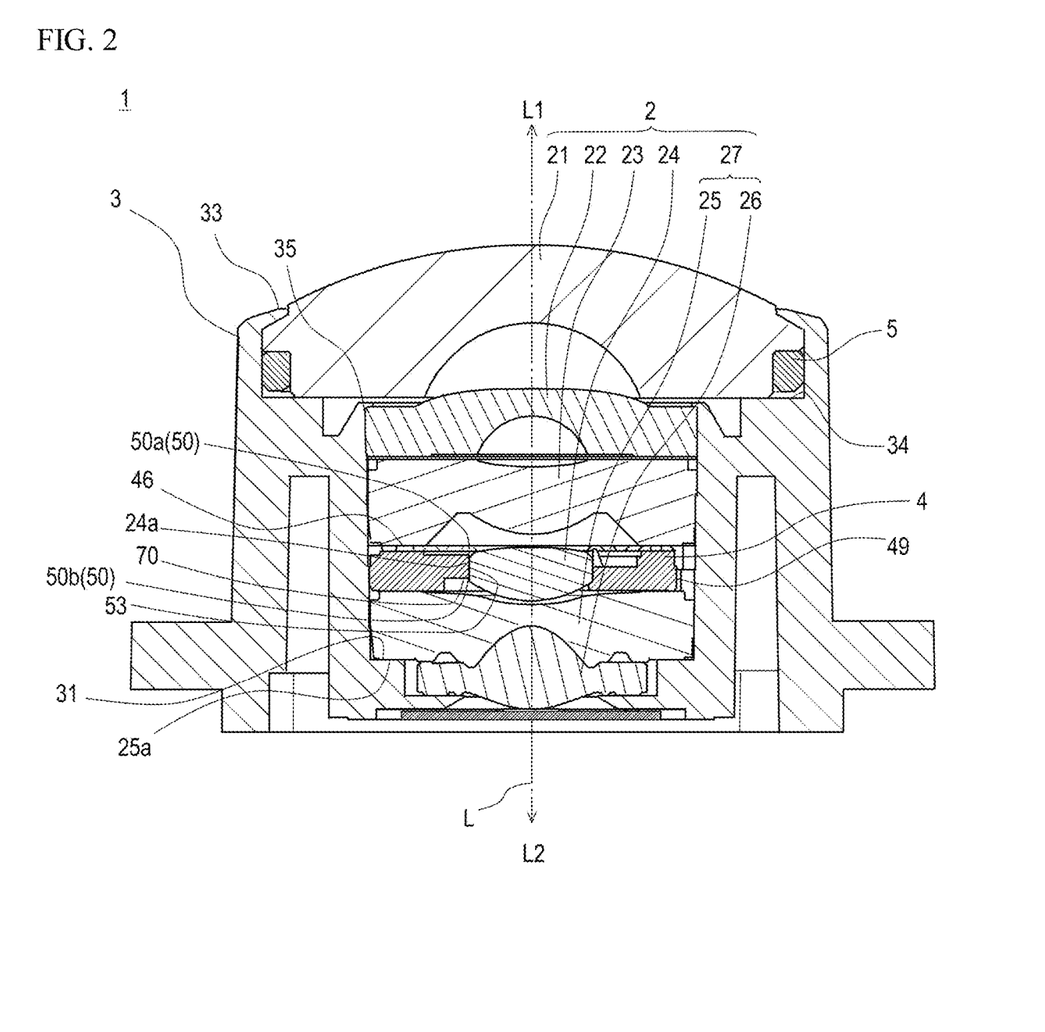
FIG. 2 is a cross-sectional view of the lens assembly according to the first embodiment.

FIG. 1 is a perspective overall view of a lens assembly 1 according to the first embodiment. FIG. 2 is a longitudinal cross-sectional view.

The lens assembly 1 is installed in an in-vehicle perimeter monitoring camera, a monitoring camera, an intercom, etc. In this embodiment, "the object side L1" and "the image side L2" correspond to the object side and the image side, respectively, in the direction of the optical axis L, and "the optical axis direction" corresponds to a direction parallel to the optical axis L.

(Overall Configuration)

The lens assembly 1 include a wide-angle lens unit 2 including a plurality of lenses and a lens barrel 3 accommodating the wide-angle lens unit 2. The wide-angle lens unit 2 includes six lenses: a first lens 21, a second lens 22, a third lens 23, a fourth lens 24, a fifth lens 25, and a sixth lens 26, disposed in tight contact with each other in this order along the optical axis L from the object side L1 to the image side L2.

The first lens 21 is disposed farthest on the object side L1, among the lenses of the wide-angle lens unit 2. The second lens 22 is disposed adjacent to the image side L2 of the first lens 21. The third lens 23 is disposed adjacent to the image side L2 of the second lens 22. The fourth lens 24 is disposed adjacent to the image side L2 of the third lens 23. The fourth lens 24 is press-fit to a resin lens holder 4 and fixed with an adhesive agent. The lens holder 4 is then disposed in the lens barrel 3. The detailed configuration of the lens holder 4 will be described below. The fifth lens 25 is disposed adjacent to the image side L2 of the fourth lens 24. The sixth lens 26 is disposed adjacent to the image side L2 of the fifth lens 25. The fifth lens 25 and the sixth lens 26 constitute a doublet 27.

The first lens 21 is composed of glass in view of prevention of scratches on the object-side lens face of the first lens 21 disposed farthest on the object side even while the object-side lens face is exposed. The second lens 22, the third lens 23, the fifth lens 25, and the sixth lens 26 are composed of plastic in view of high workability and low costs of the lenses. The fourth lens 24 is composed of glass in view of high optical properties, such as the surface precision of the lens and the refractive index of the lens in response to temperature variation.

Although the wide-angle lens unit 2 of the lens assembly 1 according to this embodiment includes six lenses, the wide-angle lens unit 2 may include any number of lenses. Moreover, the wide-angle lens unit 2 may be composed of any material and may be constituted without a doublet lens.

The lens barrel 3 is a cylindrical resin lens frame that has an inner circumferential face extending to the image side L2 along the outer circumferential faces of the lenses of the wide-angle lens unit 2. The outer circumferential faces of the first lens 21, the second lens 22, the third lens 23, the lens holder 4, the fifth lens 25, and the sixth lens 26 of the wide-angle lens unit 2 are held by the inner circumferential face of the lens barrel 3, thereby aligning the lenses along the optical axis L.

A flat portion 25a formed on the peripheral face of the fifth lens 25 on the image side L2 is placed on an annular flat portion 31 of the lens barrel 3 extending on the image side L2 in the radially inward direction. The peripheral face of the second lens 22 on the object side L1 is latched to the edge of the object-side inner circumferential face of the lens barrel 3 at a swaged portion 35.

In this way, the second lens 22, the third lens 23, the lens holder 4 (the fourth lens 24), the fifth lens 25, and the sixth lens 26 are aligned along the optical axis L. An O-ring 5 is fit to the outer circumference of the first lens 21, and then the first lens 21 fit to the O-ring 5 is fit to an annular groove 34. The circumference of the first lens 21 is then latched by a swaged portion 33 provided on the object-side edge of the lens barrel 3. Through these steps, the first lens is aligned along the optical axis L.

To prevent the second lens 22, the third lens 23, the lens holder 4 (the fourth lens 24), the fifth lens 25, and the sixth lens 26 from being disposed in a wrong order, the lenses have outer diameters that decrease in order such that the lens to be disposed farthest on the image side L2 has the smallest outer diameter, and the inner circumferential face of the lens barrel 3 is tapered to match the decreasing outer diameters of the lenses.

(Structure of Lens Holder)

Figure 3:
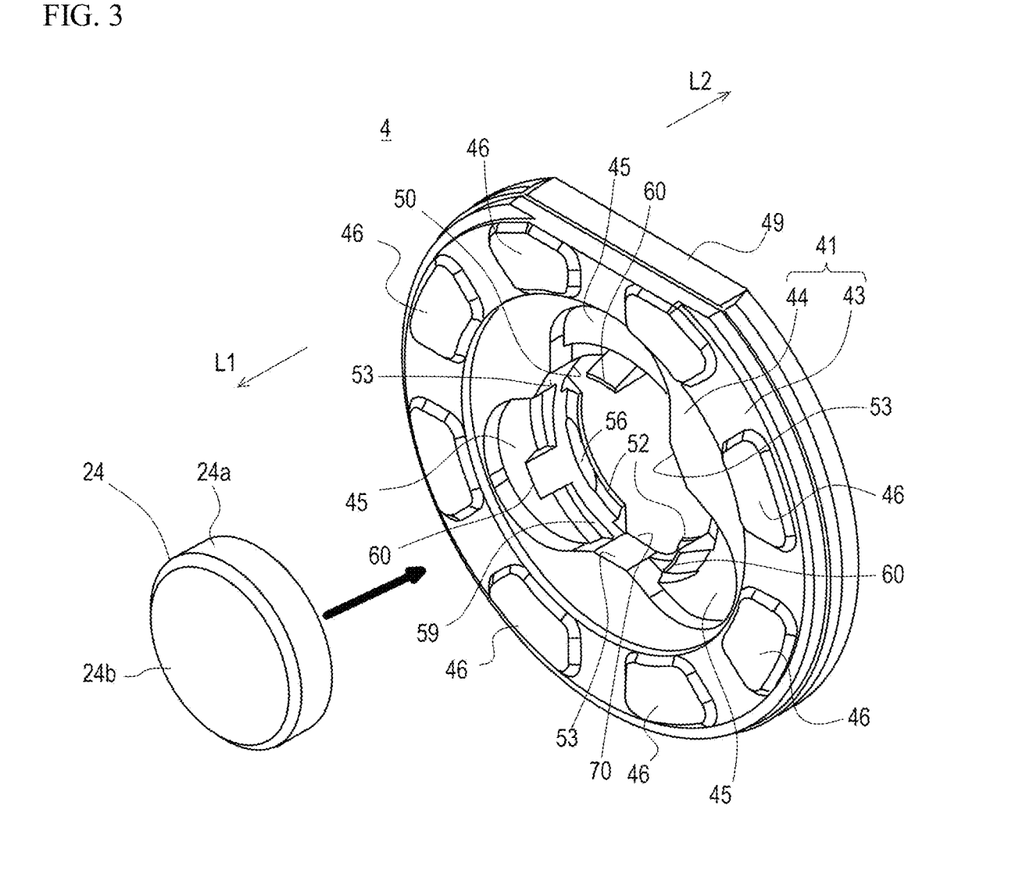
FIG. 3 is a perspective view of a lens holder according to the first embodiment with a fourth lens detached.
Figure 4:
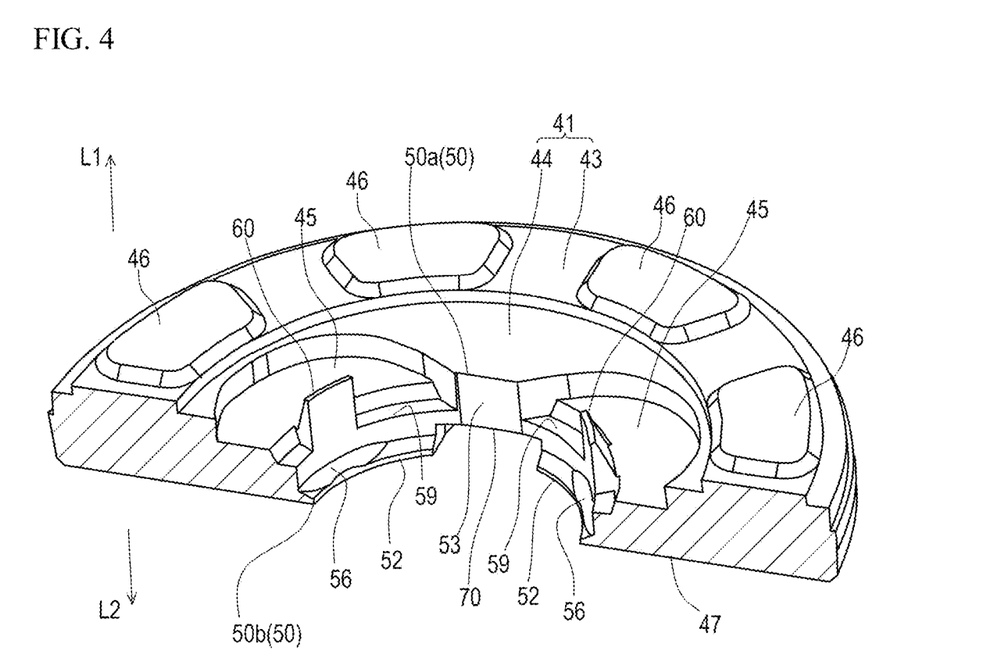
FIG. 4 is a cross-sectional perspective of the lens holder according to the first embodiment.
Figure 5:
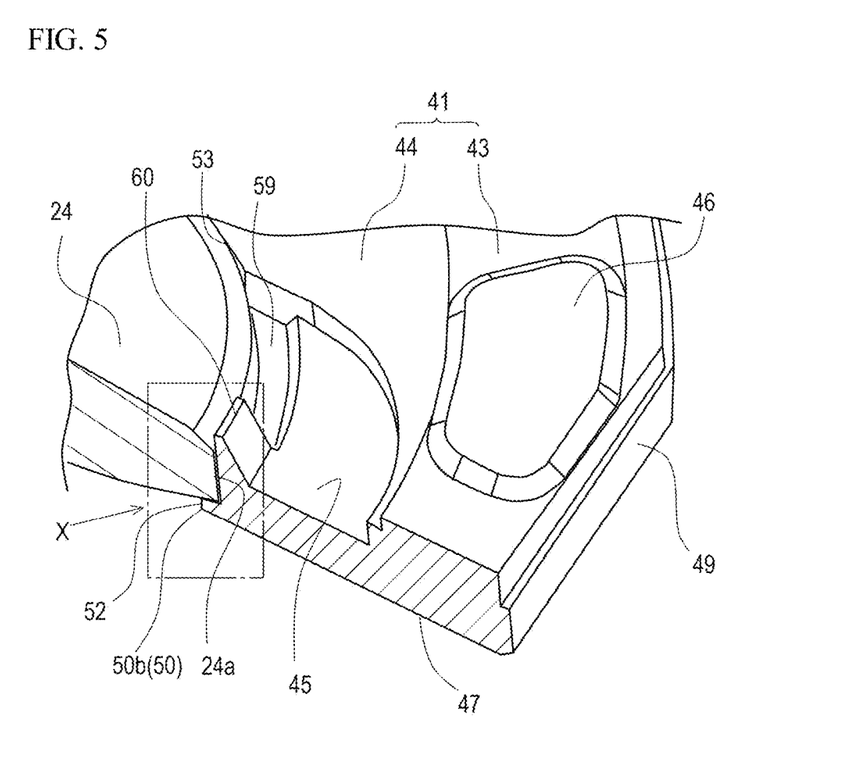
FIG. 5 is a partially enlarged cross-sectional perspective view of an adhesive-agent groove in the lens holder according to the first embodiment holding the fourth lens in a press-fit state.
Figure 6A:
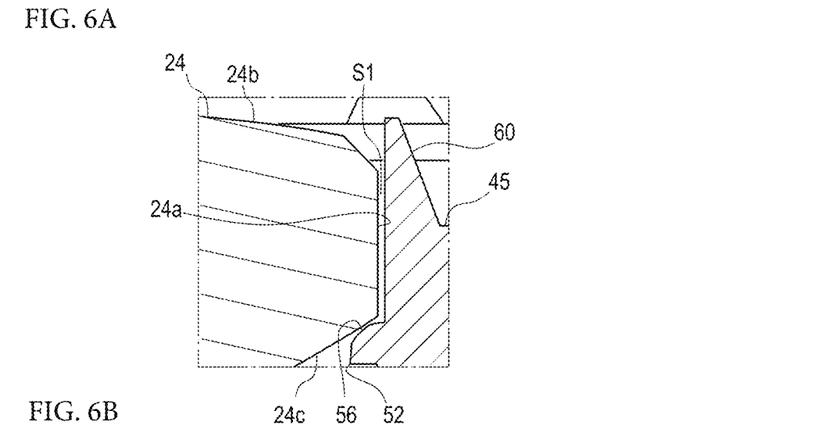
FIG. 6A, FIG. 6B, and FIG. 6C are enlarged views of the press-fit portions of the fourth lens and a cylindrical portion of the lens holder according to the first embodiment.
Figure 6B:
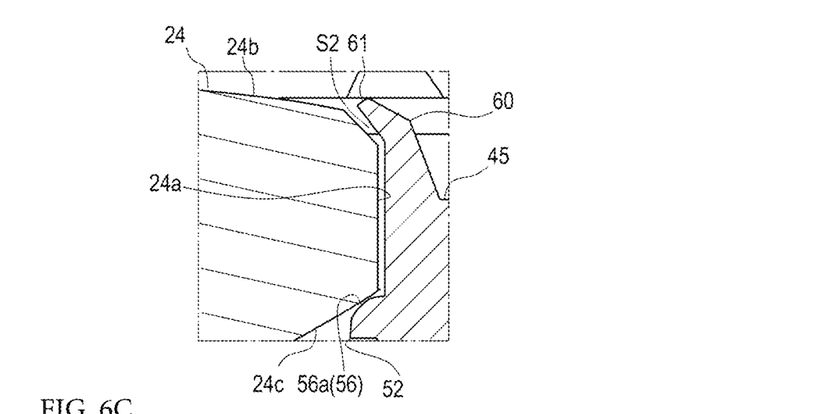
Figure 6C:
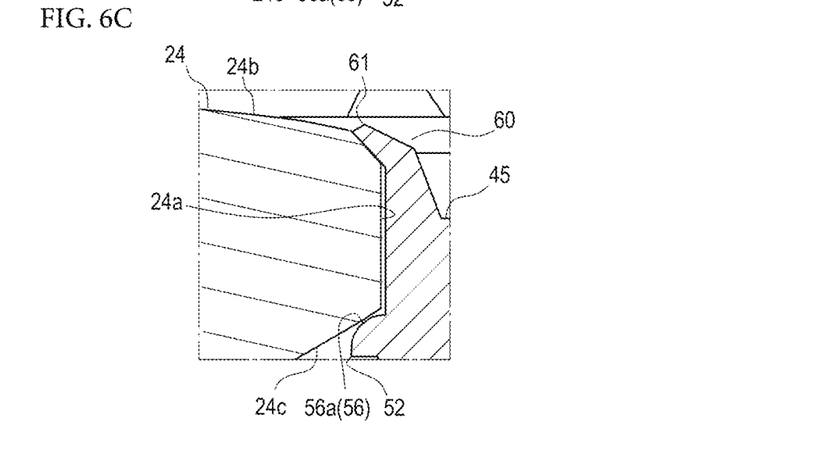
Figure 7:
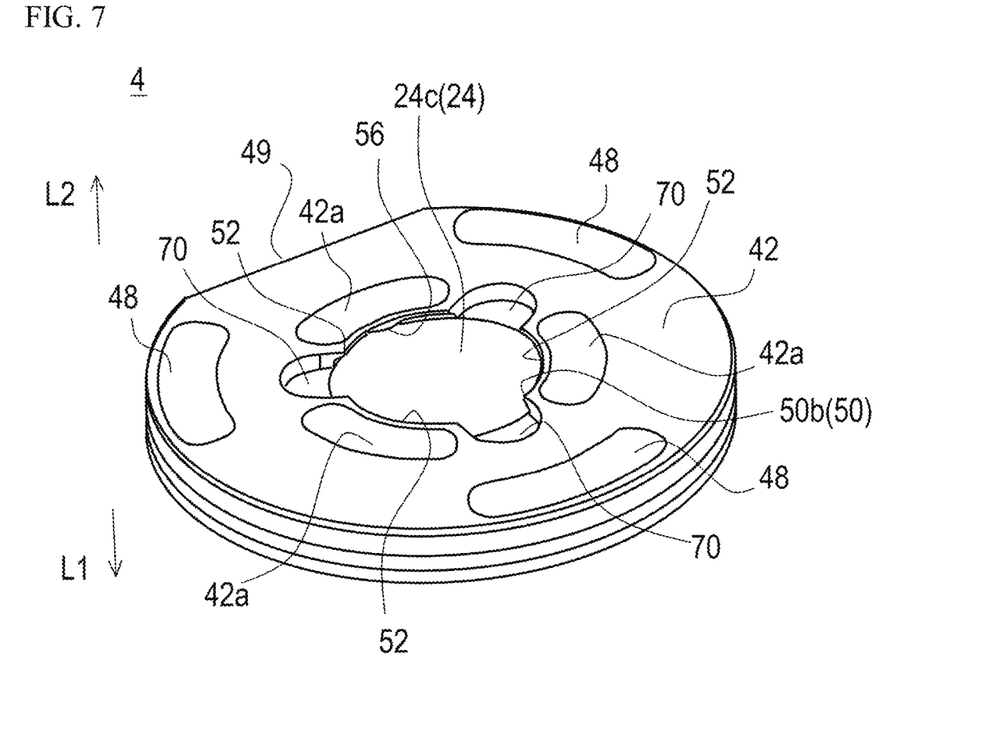
FIG. 7 is a perspective view of the image side of the lens holder according to the first embodiment.

The structure of the lens holder 4 and the fixing structure of the fourth lens 24 will now be described with reference to FIG. 3 to FIG. 7. FIG. 3 illustrates the lens holder 4 with the fourth lens 24 detached. FIG. 4 is a cross-sectional perspective view of the lens holder 4. FIG. 5 is a partial cross-sectional perspective view of an adhesive-agent groove 45 in the lens holder 4 holding the fourth lens in a press-fit state. FIG. 6A, FIG. 6B, and FIG. 6C are enlarged views of the press-fit portions of the fourth lens 24 and a cylindrical portion 50 of the lens holder 4. FIG. 7 is a perspective view of the image side L2 of the lens holder 4.

The lens holder 4 is composed of resin and has a substantially cylindrical shape. The outer circumference of the lens holder 4 has a cutoff or a D-cut portion 49. The gate of a mold is positioned at the D-cut portion 49 during resin molding.

The cylindrical portion 50 passes through the central area of the lens holder 4 from an object-side flat face 41 to an image-side flat face 42 in the direction of the optical axis L. The fourth lens 24 is press-fit and fixed to the cylindrical portion 50. In the cylindrical portion 50, the opening on the object side L1 is a fitting hole inlet 50a of the fourth lens 24, and the opening on the image side L2 is a non-fitting hole inlet 50b (see FIG. 4). The fourth lens 24 may be press-fit with a relatively small force to prevent deformation during press-fitting. An adhesive agent is used to reinforce the fixing.

The inner circumferential face of the cylindrical portion 50 has three press-fit portions 53 extending in the direction of the optical axis L at equal intervals around the circumference of the lens holder 4. The press-fit portions 53 are, for example, protrusions protruding radially inward (i.e., toward the center) of the cylindrical portion 50. The ends of the protrusions have flat faces. Recesses 70 defining spaces are provided on the image side L2 of the press-fit portions 53.

Thus, when the fourth lens 24 is fit to the cylindrical portion, the section of the side face of the inserted fourth lens 24 adjacent to the non-fitting hole inlet protrudes farther than the press-fit portions 53 in the direction of the optical axis and thus is not in a press-fit state. As a result, backlash due to residual stress does not occur, and the positional precision of the glass fourth lens 24 in the lens holder 4 can be enhanced, thereby enhancing the performance of the lens assembly 1. The recesses 70 prevent a decrease in the positional precision of the fourth lens 24 in the direction of the optical axis due to burr formed at the press-fit portions during press-fitting (shavings from the cylindrical portion formed during press-fitting).

The number of the press-fit portions 53 is not limited to three. Alternatively, more than three press-fit portions 53 may be disposed at equal intervals. Furthermore, the press-fit portions 53 may have any shape besides that described above, such as ribs or hemispherical convexes. The press-fit portions 53 are disposed at angles other than those at which the D-cut portion 49 and adhesive-agent grooves 45 are disposed in consideration of the load applied during press-fitting and the strength in the direction of the D-cut portion 49.

The fourth lens 24 fit to the cylindrical portion 50 is held and fixed at three positions. This prevents defects, such as cracking or chipping, of the lens holder 4 and the fourth lens 24 that may occur due to contraction of the resin of the lens holder 4 at low temperatures when the fourth lens 24 is fixed around its entire circumference.

The non-fitting hole inlet 50b of the cylindrical portion 50 on the image side L2 has three projections 52 protruding radially inward by a predetermined length and disposed in areas avoiding the press-fit portions 53. In specific, the press-fit portions 53 are each disposed between two projections 52, and the recesses 70 are disposed on the image side L2 opposite to the press-fit portions 53 in the direction of the optical axis. The projections 52 overlap the peripheral region of the image-side lens face 24b.

Curved portions 56 having convex surfaces (spherically or non-spherically curved surfaces) are disposed in the central areas of the projections 52. When the fourth lens 24 is press-fit to the cylindrical portion 50, the curved portions 56 and the image-side lens face 24c of the fourth lens 24 are disposed slightly apart from each other. This enables ready adjustment of tilt error of the fourth lens 24 after press-fitting. However, in the case where the periphery of the object-side lens face 24b of the fourth lens 24 is swaged, as described below, the curved portions 56 and the image-side lens face 24c may be disposed in contact with each other.

The face of the lens holder 4 on the object side L1 or the object-side flat face 41 includes an annular outer flat segment 43 adjacent to the outer circumference and an annular inner flat segment 44 adjacent to the inner circumference and slightly depressed compared to the outer flat segment 43. The inner circumferential edge of the inner flat segment 44 is the interface between of the cylindrical portion 50.

The outer flat segment 43 has eight object-side bosses 46 protruding toward the object side L1 and disposed at equal intervals along the circumferential direction of the lens holder 4. The third lens 23 is placed on the object-side bosses 46. In specific, the object-side bosses 46 function as the reference plane of the third lens 23. The number of object-side bosses 46 to be disposed is not limited to eight. The object-side bosses 46 should be disposed at equal intervals at three or more positions.

Three adhesive-agent grooves 45 are formed in the inner flat segment 44 at equal intervals along the circumferential direction of the lens holder 4. The adhesive-agent grooves 45 are disposed at 120-degree intervals relative to the position of the D-cut portion 49 (i.e., the 12 o'clock position). The adhesive-agent grooves 45 are substantially semi-circular grooves (U-shaped grooves) in top view having a predetermined depth and are connected to the fitting hole inlet 50a of the fourth lens 24 or the cylindrical portion 50. Steps 59 are formed at the interface of the adhesive-agent grooves 45 and the cylindrical portion 50. Catches 60 described below are formed in the substantially central areas of the steps 59.

After the fourth lens 24 is press-fit to the cylindrical portion 50, a predetermined volume of an adhesive agent is injected into the adhesive-agent grooves 45 through a feeding needle. The adhesive agent injected into the adhesive-agent grooves 45 flows into a gap between the fourth lens 24 and the cylindrical portion 50 due to the fluidity of the adhesive agent. The adhesive agent, for example, is of a UV curable type. The adhesive agent is cured by UV irradiation at a timing when an appropriate volume of the adhesive agent flows into the gap after the adhesive agent is injected into the adhesive-agent grooves 45. The adhesive agent suppresses displacement of the fourth lens 24 in the direction of the optical axis. The steps 59 provide contact areas to be adhered and can further suppress displacement of the fourth lens 24 in the direction of the optical axis.

The adhesive-agent grooves 45, or more specifically the steps 59 are provided with the catches 60 extending to the object side L1.

With reference to FIG. 6A, FIG. 6B, and FIG. 6C, the relation between the catches 60 and the fourth lens 24 will now be described through three examples (basic example, modification 1, and modification 2). FIG. 6A illustrates the basic example. In the basic example, the catches 60 are disposed slightly apart from the side face 24a of the fourth lens 24. The tips of the catches 60 extend above (to the object side L1) of the side face 24a. The adhesive agent injected into the adhesive-agent grooves 45 fills a gap S1 between the side face 24a and the catches 60 due to the fluidity of the adhesive agent. The contact portions 56a disposed on the projections 52 are disposed slightly apart from the image-side lens face 24c, as described above. The catches 60 provide contact areas to be adhered between the side face 24a and the cylindrical portion 50 or, more specifically, contact areas to be adhered in the thickness direction of the fourth lens 24. Such contact areas provide a stable adhesive state and suppresses displacement in the direction of the optical axis.

Alternatively, the fourth lens 24 may be disposed in contact with the curved portions 56. In such a case, the curved portions 56 constitute contact portions 56a disposed in contact with the fourth lens 24. The contact portions 56a come into point contact with the fourth lens 24 due to the spherical or non-spherical convex curved surfaces of the contact portions 56a. This can improve the positional precision of the fourth lens 24 in the lens holder 4 on the side of non-fitting hole inlet along the axial line. That is, to establish satisfactory surface contact between the contact portions 56a and the fourth lens 24, the contact face should be formed with high precision, whereas in point contact, precision can be readily improved.

With reference to the modification 1 in FIG. 6B, the tips of the catches 60 have deformed portions 61 bend radially inward by welding. Gaps S2 between the deformed portions 61 and the fourth lens 24 are filled with the adhesive agent injected into the adhesive-agent grooves 45. The curved portions 56 are disposed slightly apart from the image-side lens face 24c, as described above.

Alternatively, the fourth lens 24 may be disposed in contact with the curved portions 56. In such a case, the curved portions 56 constitute contact portions 56a disposed in contact with the fourth lens 24. The contact portions 56a come into point contact with the fourth lens 24 due to the spherical or non-spherical convex curved surfaces of the contact portions 56a. This can improve the positional precision of the fourth lens 24 in the lens holder 4 on the side of non-fitting hole inlet along the axial line. That is, to establish satisfactory surface contact between the contact portions 56a and the fourth lens 24, the contact face should be formed with high precision, whereas in point contact, precision can be readily improved. Note that only one of the deformations of the deformed portions 61 and the structure of contact between the fourth lens 24 and the contact portions 56a may be employed.

With reference to the modification 2 in FIG. 6C, the deformed portions 61 of the catches 60 function as swaged portions that swage the object-side lens face 24b. In specific, since the catches 60 and the contact portions 56a have identical shapes in the direction of the optical axis, the contact portions 56a can appropriately receive from below the load applied during swaging.

With reference to FIG. 7, the image-side flat segment 42 of the lens holder 4 has three image-side bosses 48 protruding to the image side L2 by a predetermined height and disposed at equal intervals along the circumferential direction of the lens holder 4. In specific, the image-side bosses 48 are projections that serve as a positional reference plane for the positioning of the adjacent lens (the fifth lens 25). Any number of image-side bosses 48 besides three may be disposed at equal intervals along the circumferential direction on the lens holder 4. Only the image-side bosses 48 should have high flatness, and the entire image-side flat segment 42 may have low flatness.

Protruding jig placement faces 42a are disposed near the projections 52 (the cylindrical portion 50) near the image-side flat segment 42, or more specifically, between two adjacent recesses 70. Jigs are placed on the jig placement faces 42a during press-fitting of the fourth lens 24. The jig placement faces 42a do not protrude as much as the image-side bosses 48. Thus, when the lens holder 4 is fit to the lens barrel 3, the jig placement faces 42a do not come into contact with the fifth lens 25.

The recesses 70 in the image-side flat segment 42 can function as three adhesive-agent grooves disposed at equal intervals along the circumferential direction, like the above-described adhesive-agent grooves 45 disposed on the object-side flat face 41.

The characteristics of this embodiment are as follows.

A lens assembly 1 includes a plurality of lenses (first to sixth lenses 21 to 26) and a lens barrel 3 holding the plurality of lenses (the first to sixth lenses 21 to 26). At least one of the lenses (the first to sixth lenses 21 to 26) is a glass lens (the fourth lens 24 in this embodiment) press-fit and held in a lens holder 4 including a cylindrical portion 50. Adhesive-agent grooves 45 connected to a fitting hole inlet 50a are provided in a face (an object-side flat face 41) of a lens holder 4 adjacent to the fitting hole inlet 50a to retain an adhesive agent injected into the adhesive-agent grooves 45, the glass lens (fourth lens 24) being fit to the lens holder 4 via the fitting hole inlet 50a. Catches 60 protruding in the direction of the optical axis are disposed in the adhesive-agent grooves 45. An adhesive agent fixing the glass lens (the fourth lens 24) to the lens holder 4 is disposed in a gap formed between a side face of the glass lens (the side face 24a of the fourth lens 24) and the catches 60 facing each other, the adhesive agent. The contact area to be adhered between the catches 60 and the side face of the glass lens (the fourth lens 24) can be sufficiently provided, in particular, in the thickness direction of the glass lens (the fourth lens 24), to establish a stable fixed state.

The tips of the catches 60 may have deformed portions 61 bent radially inward by welding.

A gap S2 is formed between the deformed portions 61 and the glass lens (the fourth lens 24). The adhesive agent may be disposed in the gap S2.

The lens holder 4 includes a plurality of projections 52 disposed along the circumferential direction adjacent to the non-fitting hole inlet 50b of the cylindrical portion 50. Recesses 70 disposed between two adjacent projections 52 are formed in the lens holder 4 in regions on the non-fitting hole inlet 50b facing the press-fit portions 53 in the direction of the optical axis. In other words, the regions on the non-fitting hole inlet 50b facing the press-fit portions 53 in the direction of the optical axis are not provided with the projections 52. The recesses 70 can prevent a decrease in the positional precision of the glass lens (the fourth lens 24) in the direction of the optical axis due to burr formed at the press-fit portions during press-fitting (shavings from the cylindrical portion formed during press-fitting).

The projections 52 include contact portions 56 disposed in contact with the glass lens (the fourth lens 24). The contact portions 56 may have convex curved faces. The contact portions 56 come into point contact with the glass lens (the fourth lens 24) due to the spherical or non-spherical convex curved surfaces of the contact portions 56. This improves the positional precision of the glass lens (the fourth lens 24) in the lens holder 4 on the side of non-fitting hole inlet along the axial line. That is, to establish satisfactory surface contact between the contact portions and the glass lens, the contact face should be formed with high precision, whereas in point contact, precision can be readily improved.

The deformed portions 61 are swaged portions that swage the glass lens (the fourth lens 24). The catches 60 and the contact portions 56a may have identical shapes in the direction of the optical axis. In specific, the contact portions 56 are disposed in the lower portions (on the image side L2) of the catches 60 and can support the fourth lens 24 from below during swaging.

The recesses 70 may be adhesive-agent grooves adjacent to the non-fitting hole inlet and filled with an adhesive agent. The lens holder 4 is fixed with the adhesive agent also on the non-fitting hole inlet, thereby further suppressing displacement of the fourth lens 24 in the direction of the optical axis.

Second Embodiment

Figure 8:
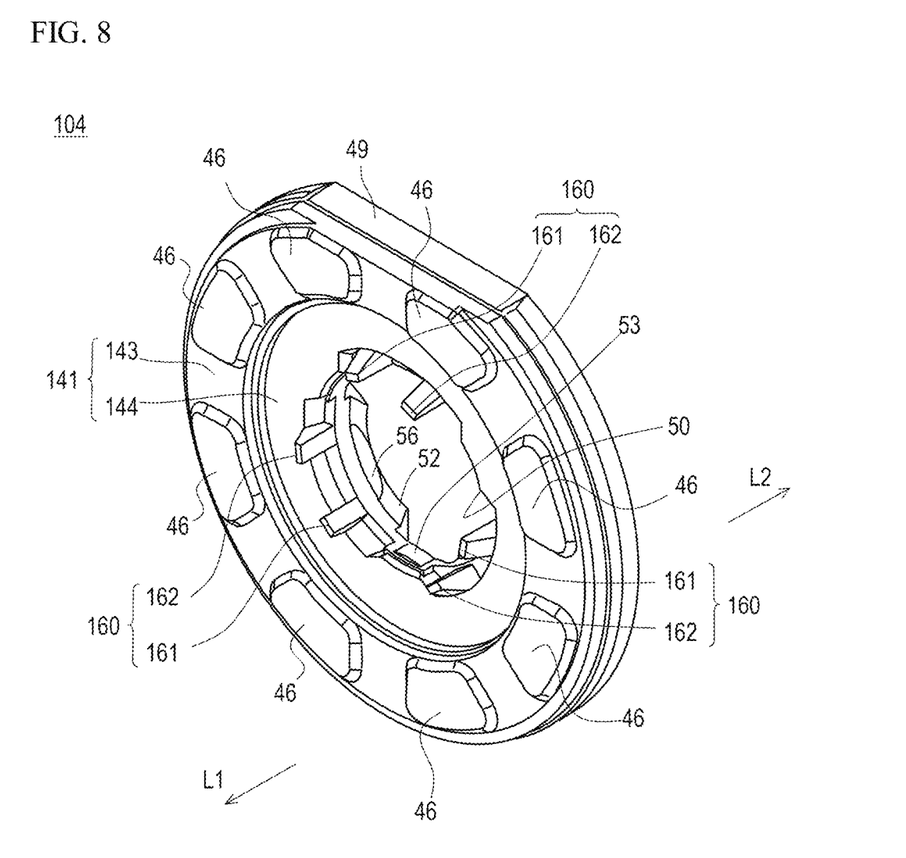
FIG. 8 is a perspective view of a lens holder according to a second embodiment.

FIG. 8 is a perspective view of a lens holder 104 according to this embodiment. The lens holder 104 is a modification of the lens holder 4 according to the first embodiment. Differences between the lens holder 104 and the lens holder 4 will be described. In specific, an object-side flat face 141 includes an outer flat segment 143 and an inner flat segment 144, as in the first embodiment. However, the inner flat segment 144 is disposed at the same depth as that of the adhesive-agent grooves 45 in the first embodiment. Thus, the adhesive-agent grooves 45 are not defined.

The steps 59 are provided with catch units 160 each including first and second catches 161 and 162. This can increase the opposing area of the catch unit 160 and the fourth lens 24 (side face 24a) or the contact area to be adhered.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens assembly comprising:
   a plurality of lenses; and
   a lens barrel holding the plurality of lenses, wherein,
   at least one of the lenses comprises a glass lens press-fit and held in a lens holder comprising a cylindrical portion,
   an adhesive-agent groove connected to a fitting hole inlet is disposed in a face of the lens holder adjacent to the fitting hole inlet to retain an adhesive agent injected into the adhesive-agent groove, the glass lens being fit to the lens holder via the fitting hole inlet,
   catches protruding along a direction of an optical axis are disposed inside the adhesive-agent groove, and
   an adhesive agent is disposed in a gap formed between a side face of the glass lens and the catches face facing each other, the adhesive agent fixing the glass lens to the lens holder,
   wherein
   the lens holder comprises a plurality of projections disposed along a circumferential direction adjacent to a non-fitting hole inlet of the cylindrical portion, and the projections comprise contact portions disposed in contact with the glass lens, and the contact portions comprise convex curved faces.

2. The lens assembly according to claim 1, wherein,
   a recess is disposed between two of the projections disposed adjacent to each other in a region adjacent to the non-fitting hole inlet facing the press-fit portion in the direction of the optical axis.

3. The lens assembly according to claim 1, wherein tips of the catches comprise deformed portions bent radially inward by welding.

4. The lens assembly according to claim 3, wherein a gap is formed between the deformed portions and the glass lens, and the gap is filled with an adhesive agent.

5. The lens assembly according to claim 3, wherein, the deformed portions comprise swaged portions swaging the glass lens, and
   the catches and the respective contact portions have identical shapes in the direction of the optical axis.

6. The lens assembly according to claim 2, wherein the recess comprises an adhesive-agent groove adjacent to a non-fitting hole inlet and filled with the adhesive agent.

7. The lens assembly according to claim 1, wherein tips of the catches comprise deformed portions bent radially inward by welding.

8. The lens assembly according to claim 7, wherein a gap is formed between the deformed portions and the glass lens, and an adhesive agent is disposed in the gap.

* * * * *